(12) United States Patent
Lair

(10) Patent No.: US 6,786,038 B2
(45) Date of Patent: Sep. 7, 2004

(54) DUPLEX MIXER EXHAUST NOZZLE

(75) Inventor: Jean-Pierre Lair, San Antonio, TX (US)

(73) Assignee: The NORDAM Group, Inc., Tulsa, OK (US)

( * ) Notice: Subject to any disclaimer, the term of this patent is extended or adjusted under 35 U.S.C. 154(b) by 0 days.

(21) Appl. No.: 10/372,551

(22) Filed: Feb. 21, 2003

(65) Prior Publication Data

US 2003/0182925 A1 Oct. 2, 2003

Related U.S. Application Data

(60) Provisional application No. 60/362,939, filed on Mar. 8, 2002, and provisional application No. 60/358,865, filed on Feb. 22, 2002.

(51) Int. Cl.[7] .................................................. F02K 3/02
(52) U.S. Cl. ......................... 60/226.1; 60/262; 181/213
(58) Field of Search ............................... 60/226.1, 262, 60/200.1, 223, 226.2, 226.3, 235, 238, 239, 242, 263, 761, 772; 181/213, 220, 212, 225; 239/265.17, 265.19, 265.23, 127.1, 127.3

(56) References Cited

U.S. PATENT DOCUMENTS

| | | | |
|---|---|---|---|
| 3,053,340 A | * | 9/1962 | Kutney .......................... 181/33 |
| 3,084,507 A | | 4/1963 | Kleinhans et al. |
| 3,092,205 A | * | 6/1963 | Brown et al. .................. 181/41 |
| 3,587,973 A | | 6/1971 | Wolf |
| 3,861,140 A | | 1/1975 | Krabacher |
| 3,927,522 A | * | 12/1975 | Bryce et al. ................... 60/264 |
| 4,401,269 A | | 8/1983 | Eiler |
| 4,543,784 A | | 10/1985 | Kirker |
| 4,836,469 A | | 6/1989 | Wagenfeld |
| 5,127,602 A | | 7/1992 | Batey et al. |
| 5,775,095 A | * | 7/1998 | Zysman et al. ................ 60/204 |

FOREIGN PATENT DOCUMENTS

GB            2119859 A   *   11/1983

OTHER PUBLICATIONS

Traeger, "Aircraft Gas Turbine Engine Technology," 1979, pp: i, ii, 151–167.

* cited by examiner

Primary Examiner—Justine R. Yu
Assistant Examiner—John F Belena
(74) Attorney, Agent, or Firm—Francis L. Conte

(57) ABSTRACT

A turbofan engine exhaust nozzle includes cooperating outer and inner mixers. The outer mixer includes alternating outer lobes and outer chutes. The inner mixer includes alternating inner lobes and inner chutes. Forward ends of the outer and inner mixers are spaced radially apart, and aft ends of the mixers are joined together to define an outlet of the nozzle for discharging exhaust flow.

27 Claims, 5 Drawing Sheets

DUPLEX MIXER EXHAUST NOZZLE

This application claims the benefit of U.S. Provisional Applications Nos. 60/358,865; filed Feb. 22, 2002, and 60/362,939; filed Mar. 8, 2002.

BACKGROUND OF THE INVENTION

The present invention relates generally to turbofan aircraft gas turbine engines, and, more specifically, to exhaust nozzles therefor.

Turbofan gas turbine engines have various configurations for powering in flight aircraft of various sizes. The engines may be mounted to the wing, to the fuselage, or to the tail of the aircraft, and in these various configurations have nacelles which provide an aerodynamically smooth outer surface for the engines for minimizing aerodynamic drag during flight.

In a typical turbofan engine, an upstream fan is powered by a core engine extending downstream therefrom. The core engine includes in serial flow communication a multistage compressor, annular combustor, high pressure turbine, and low pressure turbine. The high pressure turbine powers the compressor through a suitable shaft, and the low pressure turbine powers the fan through another shaft.

The core engine is typically surrounded by a core cowling and is spaced radially inwardly from a surrounding fan nacelle for defining an annular fan or bypass duct. In operation, the core engine powers the fan to produce propulsion thrust by discharging pressurized fan air from a fan exhaust nozzle at the aft end of the fan duct. Some of the fan air enters the core engine and is compressed and mixed with fuel for generating hot combustion gases which are discharged through a corresponding core exhaust nozzle at the aft end of the core engine.

The fan nacelle may either be a short duct, with the fan nozzle being disposed upstream from the core nozzle. Or, the fan nacelle may be long and extend for the full length of the core engine through which both the fan air and core gases are discharged through a common exhaust nozzle.

The turbofan engine is designed for maximizing its efficiency of operation, and when mounted in an aircraft, the aerodynamic cooperation therewith must be addressed. For example, the engine nacelle must be suitably smooth and configured for minimizing aerodynamic drag in propelling the aircraft in flight. And, the engine should be configured for minimizing noise generated therefrom during aircraft propulsion, particularly during takeoff operation.

A significant component of aircraft engine noise is due to the high velocity of the core exhaust flow being discharged from the core nozzle. And, another noise component is due to the relatively high velocity fan exhaust flow discharged from the fan nozzle. As the aircraft is propelled in flight, the freestream ambient air has a relatively low relative velocity to the engine being propelled therethrough. The fan exhaust has a higher velocity and engages the lower velocity freestream air with a shear interface layer therebetween. And, the core exhaust has a higher velocity which engages the fan exhaust in shear in another interface layer therebetween.

Accordingly, a significant component of aircraft engine noise is attributable to the shear interfaces between the fan exhaust and ambient air flow, and between the core exhaust and the fan exhaust.

The prior art includes many patents in which exhaust nozzles are specifically modified for reducing noise generation during aircraft flight. Many of these configurations are complex and include various forms of exhaust tubes or lobes. And, lobed daisy exhaust mixers may also be used inside the long duct engines for mixing fan bypass air with core gases for reducing noise during operation.

However, these various noise attenuation components add weight and complexity, and also affect aerodynamic performance and efficiency of the engine, and therefore require a corresponding balance or compromise in the designs thereof.

Accordingly, it is desired to provide an improved exhaust nozzle for a turbofan aircraft gas turbine engine for attenuating noise while maintaining aerodynamic performance and efficiency.

BRIEF SUMMARY OF THE INVENTION

A turbofan engine exhaust nozzle includes cooperating outer and inner mixers. The outer mixer includes alternating outer lobes and outer chutes. The inner mixer includes alternating inner lobes and inner chutes. Forward ends of the outer and inner mixers are spaced radially apart, and aft ends of the mixers are joined together to define an outlet of the nozzle for discharging exhaust flow.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
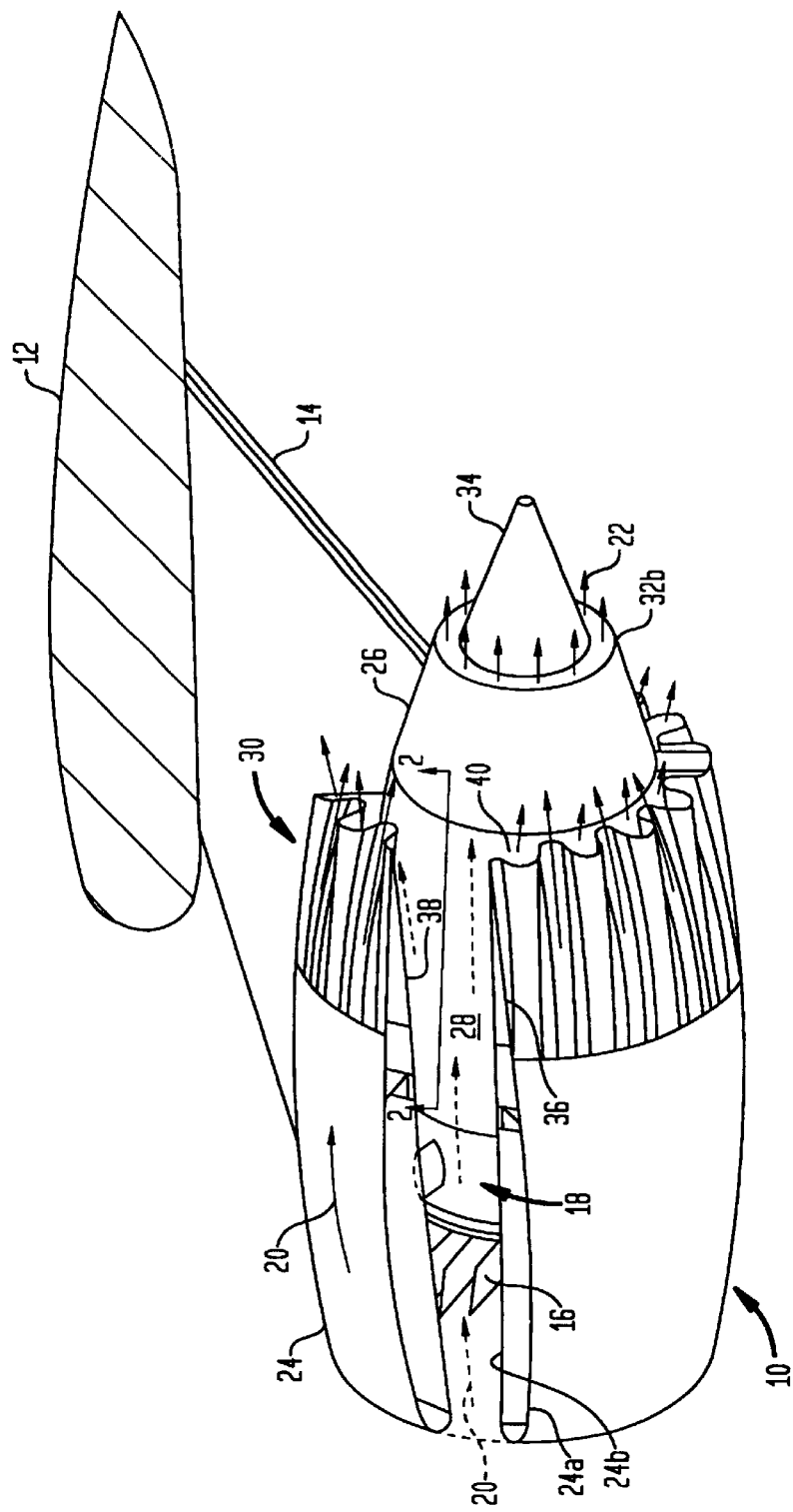
FIG. 1 is a partly sectional, isometric view of an aircraft turbofan engine having a fan exhaust nozzle in accordance with an exemplary embodiment of the present invention.

Illustrated in FIG. 1 is turbofan gas turbine engine 10 suitably mounted to the wing of an aircraft 12 by a pylon 14. The engine includes a fan 16 at its forward or upstream end which is powered by a core engine 18 extending aft or downstream therefrom.

The core engine may have any conventional configuration, and typically includes in serial flow communication a multistage axial compressor for pressurizing ambient air 20 which is mixed with fuel in an annular combustor for generating hot combustion gases 22 from which energy is extracted. A high pressure turbine in the core engine powers the compressor through a shaft therebetween, and a low pressure turbine powers the fan 16 through another shaft therebetween.

An annular fan nacelle 24 surrounds both the fan 16 and core engine 18 to provide an aerodynamically smooth outer surface for the engine. The core engine is contained in an annular outer cowling 26 which is spaced radially inwardly from the fan nacelle to define an annular fan duct 28 radially therebetween for channeling the pressurized air 20 from the fan for discharge as fan exhaust flow.

In the exemplary embodiment illustrated in FIG. 1, the nacelle 24 is short and terminates upstream from the aft end of the core engine in a fan exhaust nozzle 30 in accordance with an exemplary embodiment of the present invention. The pressurized fan exhaust 20 is discharged aft from the fan nozzle 30 over a corresponding core exhaust nozzle 32b, from which the core flow 22 is discharged during operation. The core nozzle 32b typically includes a conical center plug 34 over which the core gases are discharged during operation.

Figure 2:
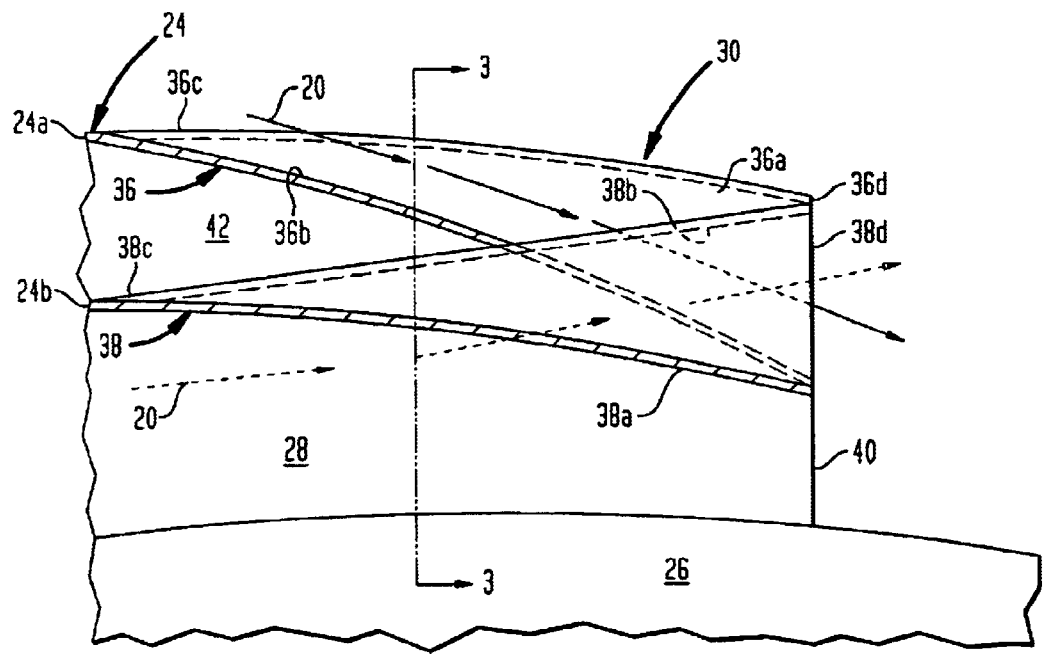
FIG. 2 is an axial sectional view of the fan nozzle illustrated in FIG. 1 and taken generally along line 2—2 showing one lobe hidden in aft cart behind the next circumferentially adjacent lobe.
Figure 3:
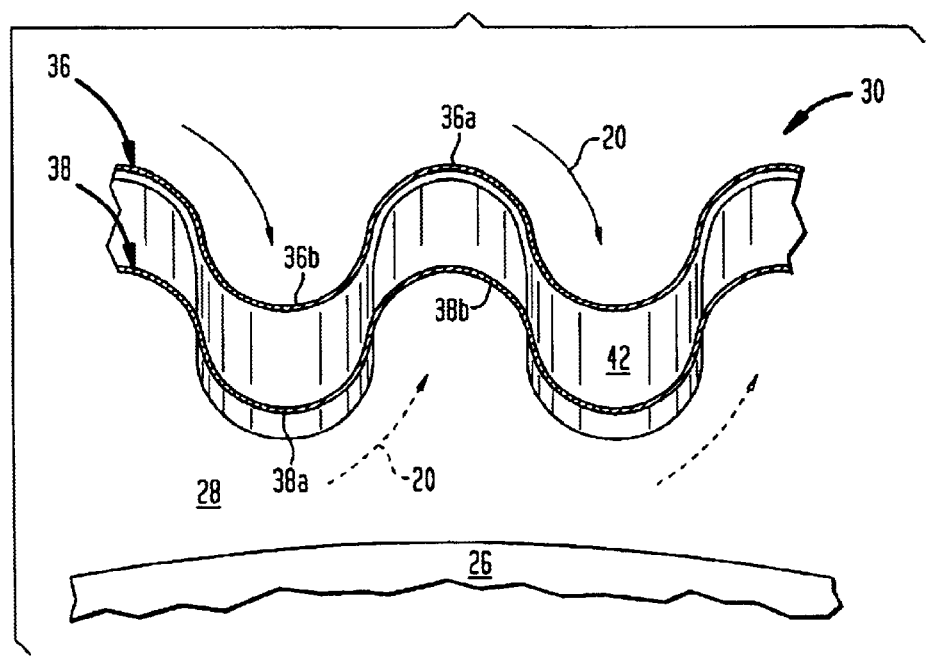
FIG. 3 is a forward-facing-aft view of a portion of the fan nozzle illustrated in FIG. 2 and taken along line 3—3.

The fan nozzle 30 is additionally illustrated in FIGS. 2 and 3 and includes coaxial outer and inner lobed mixers 36,38. As shown in FIG. 3, the outer mixer 36 includes a plurality of circumferentially alternating outer peaks or lobes 36a and outer valleys or chutes 36b.

As shown in FIG. 2, the outer lobes and chutes extend axially between a forward end 36c adjoining the fan nacelle, and an aft or distal end 36d of the mixer. The outer lobes 36a project radially outwardly from the axial centerline axis of the engine, and the outer chutes 36b extend radially inwardly between adjacent ones of the lobes. In this way, the outer chutes have generally U-shaped circumferential profiles for forming flow conduits or troughs through which the ambient freestream air may be channeled aft during operation. The intervening outer lobes 36a bound the outer chutes 36b on opposite circumferential sides thereof, and share common radial sidewalls therebetween.

The inner mixer 38 is disposed coaxially inside the outer mixer 36 and similarly has a plurality of circumferentially alternating inner lobes 38a and inner chutes 38b extending axially between forward and aft ends 38c,d. The inner lobes 38a project radially inwardly, and the inner chutes 38b extend radially outwardly. In this way, the inner chutes have generally inverted U-shaped circumferential profiles for forming flow conduits or troughs through which the fan exhaust flow may be channeled aft during operation. The intervening inner lobes 38a bound the inner chutes 38b on opposite circumferential sides thereof, and share common radial sidewalls therebetween.

As shown in FIG. 2, the forward ends 36c,38c of the outer and inner mixers 36,38 are spaced radially apart at the fan nacelle, and the aft ends 36d,38d of the outer and inner mixers are suitably joined together, by brazing for example, to define a common nozzle outlet 40 for discharging the fan exhaust flow 20 during operation.

As illustrated in FIG. 3, the outer lobes 36a are aligned radially with respective ones of the inner chutes 38b, and the outer chutes 36b are aligned radially with respective ones of the inner lobes 38a in a one-to-one nested duplex mixer configuration. In this way, the two mixers are radially nested together valley-to-peak and peak-to-valley around the circumferential extent of the nozzle.

In the wing-mounted configuration of the turbofan engine shown in FIG. 1, the pylon 14 interrupts the circumferential continuity of the fan nacelle and its fan nozzle. Accordingly, the fan nacelle is configured in two semi-circular halves which are hinged at the pylon in a conventional manner for permitting opening of the fan nacelle to access the inside of the engine. The split fan nacelle splits the fan duct 28 into two C-ducts extending from the pylon down to a longitudinal beam at the bottom of the engine in a conventional manner.

As shown in FIGS. 1 and 2, the outer and inner mixers 36,38 are integrated with the aft end of the otherwise conventional C-duct fan nacelle, and converge together axially aft between the forward and aft ends of the mixers. The aft ends of the two mixers extend radially in a common axial plane in one embodiment to define the fan nozzle surrounding the core engine.

The radial depth of the outer chutes 36b increases between the forward and aft ends of the outer mixer to a maximum depth at the aft end of the outer mixer where it joins the aft end of the inner mixer. Correspondingly, the radial depth of the inner chutes 38b increases between the forward and aft ends of the inner mixer to a maximum depth at the aft end of the inner mixer where it joins the outer mixer. In this way, the outer mixer 36 provides an aft extension of the fan nacelle over which the freestream air flows. And, the inner mixer 38 provides the outer boundary of the aft end of the fan duct 28 through which the pressurized fan air is discharged through the nozzle outlet 40.

Accordingly, the outer and inner mixers 36,38 provide separate and independent flow bounding surfaces for the different functions corresponding with the external fan nacelle and internal fan duct which have correspondingly different design objectives and performance in the operation of the turbofan engine.

For example, the inner mixer 38 defines the aft end of the fan duct 28 surrounding the core cowling 26, and converges axially aft between the forward and aft ends 38c,d of the inner mixer.

As shown in FIGS. 1 and 2, the fan nacelle 24 has a smooth outer skin 24a and a smooth inner skin 24b spaced radially apart from each other between the opposite axial ends of the nacelle. The outer mixer 36 extends aft from the outer skin 24a in a thin sheet metal extension thereof. Correspondingly, the inner mixer 38 extends aft from the nacelle inner skin 24b in a thin sheet metal extension thereof.

The inner mixer 38 preferably converges aft from the nacelle inner skin for converging or decreasing the flow area in the fan duct 28 around the core cowling 26 to the nozzle outlet 40 which defines a throat of minimum flow area. Whereas a conventional fan duct has a smooth, plain flow bounding surface for decreasing flow area, the convoluted inner mixer 38 may also be configured for similarly converging the flow area of the fan duct to the nozzle outlet notwithstanding the alternating inner lobes and chutes thereof. In this way, the fan duct 28 may be independently configured in desired flow area distribution using the inner mixer for maximizing performance of the engine.

Correspondingly, the convoluted outer mixer 36 may be introduced in the fan nacelle for covering the similarly convoluted inner mixer 38 to maintain the aerodynamically smooth outer surface of the fan nacelle, while providing additional advantage in attenuating noise from the fan exhaust.

More specifically, in the exemplary embodiment illustrated in FIGS. 1 and 2, the outer mixer 36 converges axially aft between its forward and aft ends 36c,d with a relatively shallow convergence angle which varies between the lobes and chutes thereof. The outer mixer forms a smooth extension of the nacelle outer skin 24a and converges aft along the outer chutes 36b, as well as along the outer lobes 36a in the exemplary embodiment.

The outer mixer 36 thusly introduces the outer chutes 36b to channel the freestream airflow radially inwardly along the outer chutes for forced mixing with the pressurized fan air being discharged through the fan duct 28 along the inner chutes. Mixing of the freestream air and the fan exhaust air at the nozzle outlet 40 rapidly decreases the high velocity of the fan air for correspondingly reducing noise generated therefrom.

Furthermore, as the freestream air is channeled through the outer chutes 36b it is accelerated therein which decreases the thickness of the boundary layer of the freestream air along the outer chutes, which correspondingly decreases the difference in relative velocity between the freestream air and the fan discharge air in the shear interface layer therebetween.

The dual or duplex outer and inner mixers are thusly nested together for improving the interface between the freestream air and the fan exhaust air for reducing noise generation therefrom while maintaining aerodynamic performance of the fan nacelle, reducing aerodynamic drag, and maintaining aerodynamic performance of the fan duct itself. Freestream air acceleration through the outer chutes in combination with forced mixing of the fan exhaust through the inner chutes may be used for significant noise attenuation in the fan exhaust nozzle 30 in accordance with this preferred embodiment of the invention.

Since the fan nacelle 24 illustrated in FIG. 1 has a finite radial thickness and is bound radially outwardly and inwardly by the corresponding skins 24a,b, the two mixers 36,38 may be specifically configured for separately cooperating with those outer and inner skins for enhanced performance. As shown in FIG. 2, both mixers converge aft from the corresponding nacelle skins, with the outer mixer 36 converging less than the inner mixer, and with a shallower angle of convergence. In this way, flow separation between the freestream air and the outer chutes may be reduced, the thickness of the boundary layer may also be reduced for reducing the differential velocity in the interface layer or zone between the freestream air and the fan exhaust flow downstream of the nozzle outlet.

As shown in FIG. 2, since the outer and inner mixers are radially spaced apart from each other they define an empty plenum 42 which extends both circumferentially between the mixers and axially along the length thereof terminating at the aft ends of the mixers where they join together to define the common or single nozzle outlet 40. Since the outer and inner chutes 36b,38b define the flow channels or troughs along which the freestream and fan exhaust are channeled, these chutes are isolated from the internal plenum 42.

As shown in FIG. 3, the plenum 42 is confined by the two mixers, and no airflow is found along the inner surface of the outer mixer or along the outer surface of the inner mixer. This configuration is unlike the conventional single lobed mixer which may be used inside turbofan engines in which both outer and inner surfaces of the same, single ply mixer channel the fan bypass air and core exhaust for forced mixing inside the engine.

FIG. 1 illustrates the introduction of the outer and inner mixers 36,38 in the fan exhaust nozzle 30 at the aft end of the fan nacelle 24. The fan nozzle outlet 40 surrounds the internal core cowling 26 and terminates upstream from the aft end thereof in the short nacelle configuration. And, the outer and inner mixers maintain separate the freestream air and fan exhaust until they join and mix at the common aft ends thereof.

Disposed at the aft end of the core cowling 26 is the core exhaust nozzle 32b which may have any conventional configuration such as the smooth conical form illustrated in FIG. 1, with a plain, non-convoluted outer surface over which the fan exhaust is discharged during operation.

Figure 4:
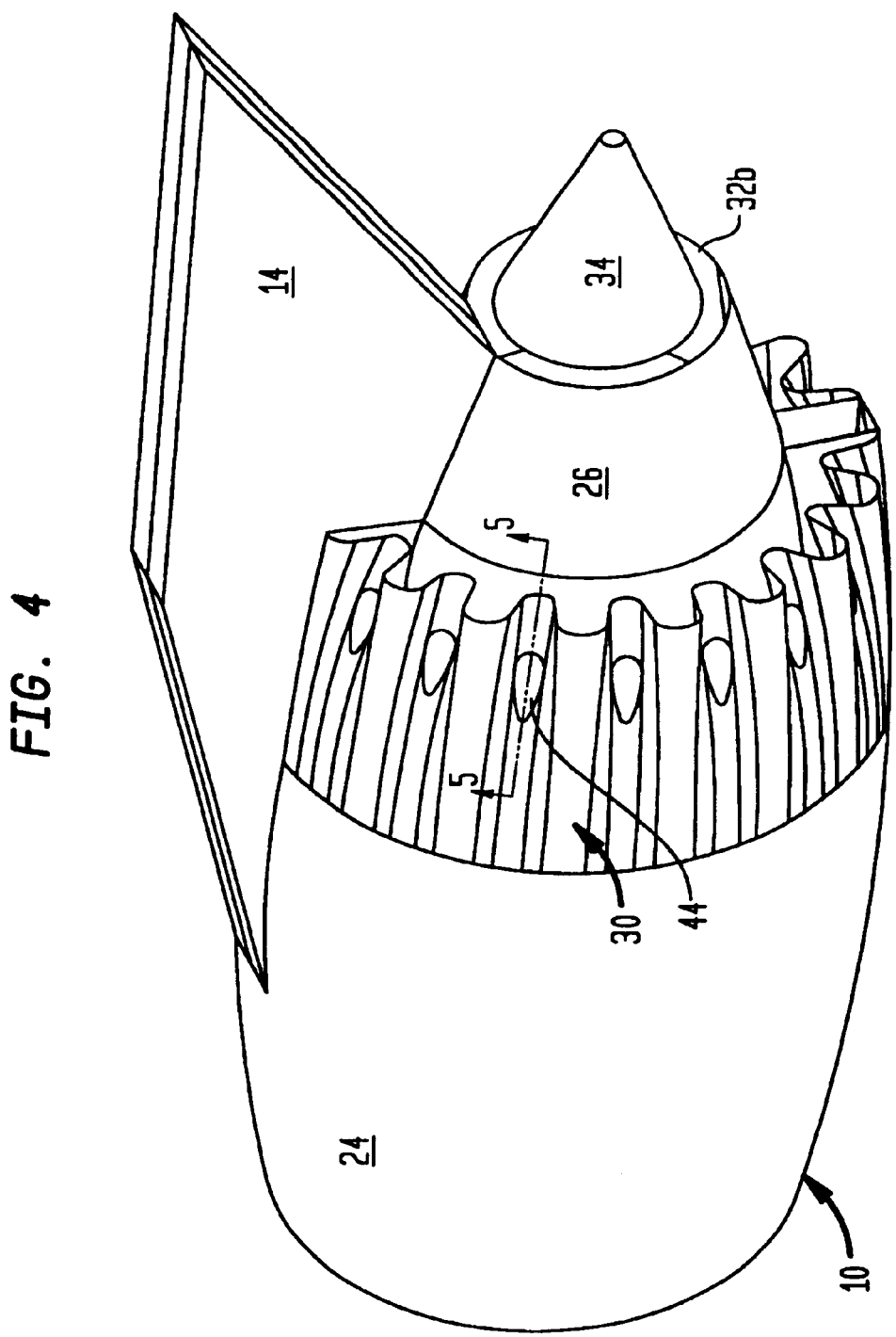
FIG. 4 is an isometric view of the fan nozzle illustrated in FIG. 1 in accordance with another embodiment.
Figure 5:
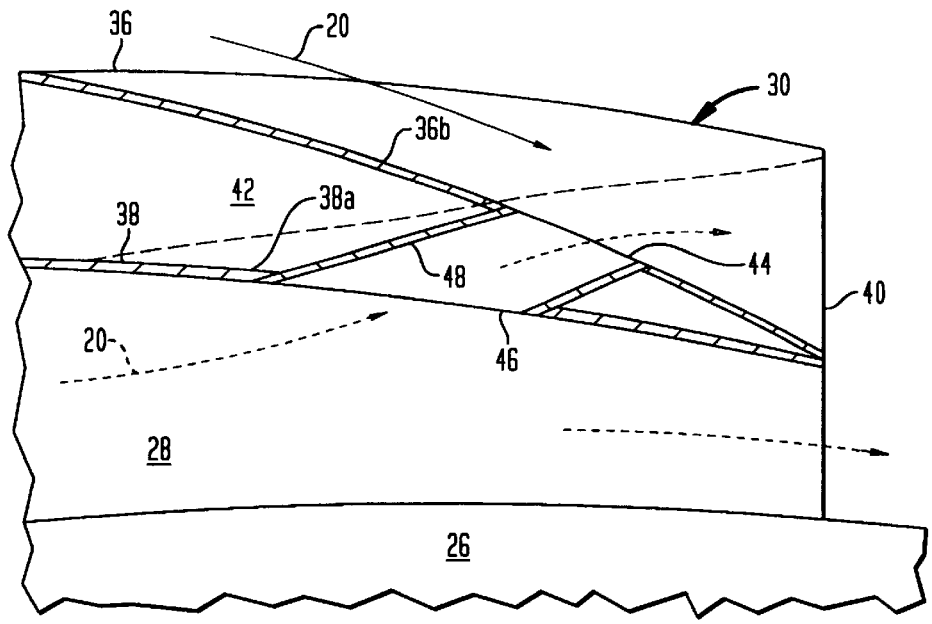
FIG. 5 is an axial sectional view through the fan nozzle illustrated in FIG. 4 and taken along line 5—5.

Illustrated in FIGS. 4 and 5 is another embodiment of the fan nozzle 30 which includes a plurality of outer apertures 44 disposed in respective ones of the outer chutes 36b of the outer mixer. The outer apertures are preferably elliptical in profile having their major axes extending in the axial direction along the corresponding longitudinal axis of each of the outer chutes 36b.

The fan nozzle illustrated in FIG. 5 also includes a respective plurality of inner apertures 46 disposed in respective ones of the inner lobes 38a in the inner mixer in suitable flow communication with the outer apertures 44. The outer apertures 44 are preferably spaced upstream or forward from the aft end of the outer mixer, with the inner apertures 46 being spaced further forward or upstream therefrom.

In the preferred embodiment illustrated in FIG. 5, a corresponding tube 48 extends between the corresponding outer and inner apertures 44,46 in each of the outer chutes 36b for providing direct flow communication from the fan duct 28 into the corresponding outer chutes 36b. The tubes prevent flow communication into the plenum 42 between the two mixers.

In this way, a portion of the pressurized fan air channeled through the fan duct 28 may be diverted through the tubes 48 for further accelerating the freestream airflow being channeled through the outer chutes 36b. This bypassed fan air re-energizes the freestream air in the outer chutes for both increasing the velocity thereof as well as reducing flow separation and the size of the boundary layer. This configuration may be used for further attenuating fan exhaust noise as well as reducing overall drag of the nacelle by the reduction in the boundary layer thickness.

Figure 6:
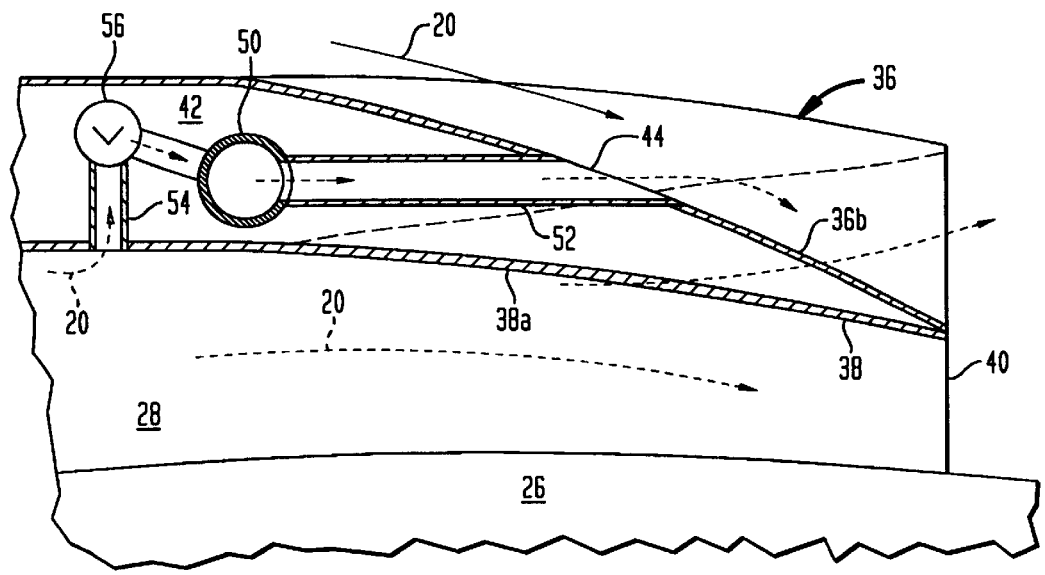
FIG. 6 is an axial sectional view, like FIG. 5, of the fan nozzle in accordance with another embodiment.
Figure 7:
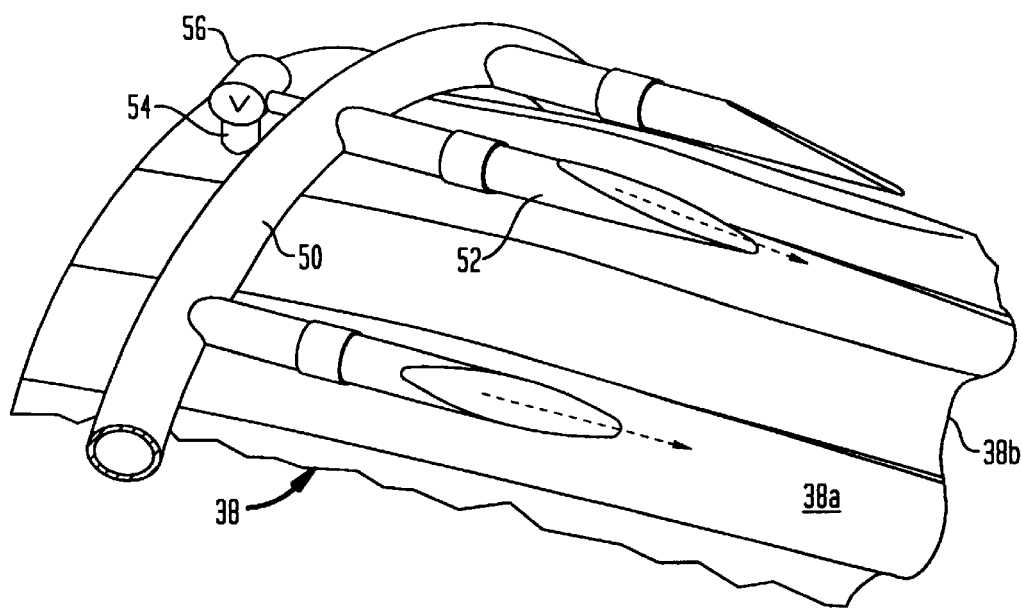
FIG. 7 is an isometric view of a portion of the fan nozzle illustrated in FIG. 6 with an outer mixer removed therefrom for clarity of presentation.

FIGS. 6 and 7 illustrate yet another embodiment of the fan nozzle in which the outer mixer 36 includes the outer apertures 44 in the corresponding outer chutes 36b, but the inner lobes 38a of the inner mixer are imperforate adjacent the outer apertures in the outer chutes.

In this configuration, an arcuate manifold 50 is disposed circumferentially in the open plenum 42 forward or upstream from the outer apertures 44. A plurality of conduits 52 extend in flow communication from the common manifold 50 to respective ones of the outer apertures 44.

Suitable means are provided for selectively supplying pressurized airflow to the manifold 50 for discharge through the outer apertures 44 for accelerating the freestream airflow through the corresponding outer chutes 36b in a manner similar to that described above with respect to FIG. 5, as well as reducing flow separation therein and reducing boundary layer thickness.

In the exemplary embodiment illustrated in FIGS. 6 and 7, the means for supplying pressurized flow to the manifold includes a suitably sized inlet tube 54 extending through the forward end of the inner mixer in flow communication with the common manifold 50 at one end and the fan duct 28 at the other end. A corresponding valve 56 may be provided between the inlet tube and the manifold for controlling the on and off operation of the flow therethrough into the outer mixer.

For example, the valve may be operated to provide pressurized flow through the manifold and the outer apertures during takeoff operation and climb of the aircraft when it is desired to maximize noise reduction in the vicinity of airports. At a predetermined altitude or cruise operation, the valve may be closed to prevent the loss of pressurized fan air through the outer apertures and maximize engine performance.

Any suitable source of pressurized air may be provided to the manifold 50, such as directly from the fan duct 28 as illustrated in FIGS. 6 and 7. Alternatively, a dedicated supply conduit may extend from the manifold to the compressor of the core engine 18 for suitably providing bleed air to the outer mixer when desired.

The outlet apertures 44 illustrated in FIGS. 5–7 are preferably located in an intermediate region between the forward and aft ends of the outer mixer for maximizing the benefit of pressurized flow introduction therefrom. Since the air discharged through the outer apertures is pressurized it will be discharged from the apertures at a relatively high velocity. By locating this discharged airflow downstream from the forward end of the outer chutes, aerodynamic drag may be reduced.

By introducing the pressurized flow downstream in the outer chutes, the freestream airflow may be accelerated in those chutes; flow separation therein may be reduced; and the boundary layer of the outer chute flow may be reduced for decreasing the differential velocity between the freestream airflow and the fan exhaust at the shear interface region therebetween. And, the substantial forced mixing of the freestream air and fan exhaust by the cooperating duplex mixers 36,38 significantly reduces the velocity of the fan exhaust and the corresponding noise therefrom.

Figure 8:
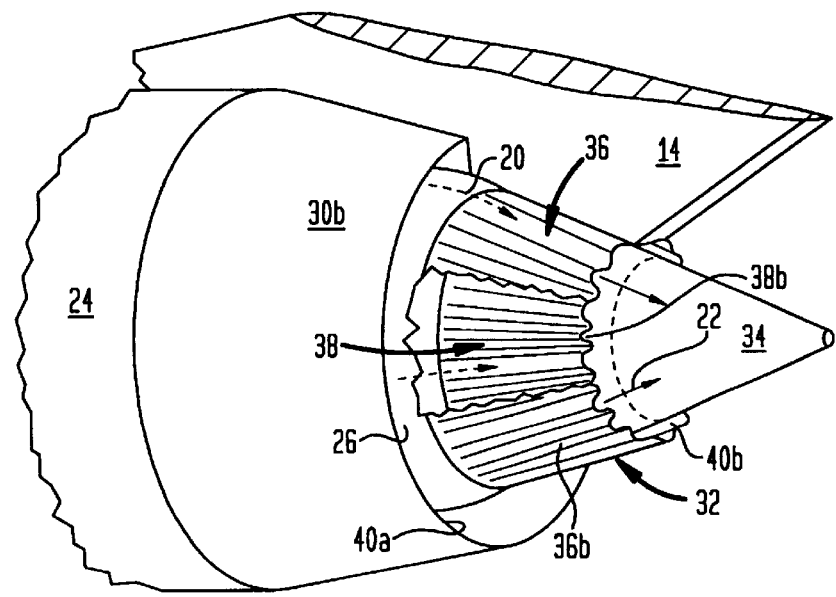
FIG. 8 is an isometric view of a portion of the turbofan engine illustrated in FIG. 1 having a core exhaust nozzle in accordance with another embodiment of the present invention.

FIGS. 1–7 disclosed above illustrate the fan nozzle form of the duplex mixers 36,38 for mixing the ambient freestream airflow from outside the fan nacelle with the pressurized fan exhaust from inside the fan nacelle. FIG. 8 illustrates an alternate embodiment in which the fan exhaust nozzle, designated 30*b*, has a conventional circumferentially smooth configuration without mixers or convolutions, with the core exhaust nozzle, designated 32, having the duplex outer and inner mixers 36,38 introduced therein in a similar manner. In this configuration, the outer chutes 36*b* of the outer mixer channel the fan exhaust 20 from the conventional fan nozzle outlet 40*a* for mixing with the core exhaust flow 22 channeled along the inner chutes 38*b* of the inner mixer at the corresponding convoluted core nozzle outlet, designated 40*b*.

The conical center plug 34 illustrated in FIG. 8 is spaced radially inwardly from the inner mixer 38 and extends aft therefrom to define the core exhaust duct radially therebetween terminating at the convoluted core nozzle 32.

The duplex mixer core nozzle 32 enjoys similar performance to the duplex mixer fan nozzle 30 described above. And, the core nozzle may be configured in any of the various embodiments disclosed above for the fan nozzle for providing forced mixing of the fan exhaust and the core exhaust by the cooperating outer and inner mixers 36,38. The outer mixer 36 in the core nozzle now defines the outer portion of the core cowling which reduces aerodynamic drag of the discharged fan exhaust. And, the inner mixer of the core nozzle now defines the outer boundary of the core exhaust duct surrounding the center plug 34 for providing the desired flow area distribution therealong for maximizing performance of the core engine during operation.

In FIG. 8, the fan nozzle 30*b* may have any conventional configuration and includes the aerodynamically smooth, conical outer surface being plain without the lobed mixers or convolutions illustrated in the FIG. 1 embodiment. The lobed mixers are instead provided only in the core exhaust nozzle 32.

However, the duplex mixers may be used in both the fan nozzle 30 illustrated in FIG. 1 and in the core nozzle 32 illustrated in FIG. 8 if desired.

In the turbofan aircraft gas turbine engine described above, both fan exhaust and core exhaust are discharged therefrom at correspondingly different velocities, and with a velocity different than the freestream airflow over the engine nacelle during aircraft flight. The fan duct and the corresponding core exhaust duct are located inside the engine, whereas the corresponding fan nacelle and core cowling are located outside the fan and the core engine, respectively.

The duplex outer and inner mixers may be advantageously introduced as extensions of the corresponding outer and inner skins of the fan nacelle and the core cowling to define the improved fan and core exhaust nozzles as desired. Forced mixing of the corresponding outer and inner flowstreams channeled along the outer and inner mixers provides advantage during operation in reducing noise. And, the separately introduced outer and inner mixers suitably blend with the corresponding outer and inner skins of the fan nacelle or the core cowling to preferentially maintain the desired performance thereof in view of their different design requirements in the engine.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which I claim:

1. An exhaust nozzle comprising:
   an outer mixer having a plurality of circumferentially alternating outer lobes and outer chutes extending axially between forward and aft ends thereof, with said outer lobes projecting radially outwardly, and said outer chutes extending radially inwardly;
   an inner mixer disposed coaxially inside said outer mixer, and having a plurality of circumferentially alternating inner lobes and inner chutes extending axially between forward and aft ends thereof, with said inner lobes projecting radially inwardly, and said inner chutes extending radially outwardly; and
   said outer and inner mixers being spaced radially apart from each other to define a plenum therebetween extending both circumferentially between a plurality of adjacent lobes and axially from said forward ends and terminating at said aft ends, with said aft ends of said outer and inner mixers being joined together to prevent flow discharge therebetween and to define a common outlet of said nozzle at said inner chutes for discharging exhaust flow.

2. A nozzle according to claim 1 wherein said outer lobes are aligned radially with said inner chutes, said outer chutes are aligned radially with said inner lobes, and said outer and inner chutes have similar, but inverted circumferential profiles spaced apart circumferentially at corresponding radial sidewalls.

3. A nozzle according to claim 2 wherein said outer and inner mixers converge together axially aft between said forward and aft ends thereof.

4. A nozzle according to claim 3 wherein said aft ends of said outer and inner mixers extend radially in a common axial plane.

5. A nozzle according to claim 3 wherein said inner mixer converges axially aft between said forward and aft ends thereof.

6. A nozzle according to claim 3 wherein said outer mixer converges axially aft between said forward and aft ends thereof.

7. A nozzle according to claim 3 wherein said outer and inner mixers converge aft, with said outer mixer converging less than said inner mixer.

8. A nozzle according to claim 3 wherein said plenum is isolated from said outer and inner chutes.

9. An exhaust nozzle comprising:
   an outer mixer having a plurality of circumferentially alternating outer lobes and outer chutes extending axially between forward and aft ends thereof, with said outer lobes projecting radially outwardly, and said outer chutes extending radially inwardly;
   a plurality of outer apertures disposed in said outer chutes;
   an inner mixer disposed coaxially inside said outer mixer, and having a plurality of circumferentially alternating inner lobes and inner chutes extending axially between forward and aft ends thereof, with said inner lobes projecting radially inwardly, and said inner chutes extending radially outwardly; and
   said forward ends of said outer and inner mixers being spaced radially apart, and said aft ends of said outer and inner mixers being joined together to define a common outlet of said nozzle for discharging exhaust flow.

10. A nozzle according to claim 9 wherein said outer apertures are elliptical in profile in said outer chutes.

11. A nozzle according to claim 9 wherein said outer apertures are spaced forward from said aft end of said outer mixer.

12. A nozzle according to claim 9 further comprising a plurality of inner apertures disposed in said inner lobes in flow communication with said outer apertures.

13. A nozzle according to claim 12 wherein said inner apertures are disposed forward of said outer apertures.

14. A nozzle according to claim 12 further comprising corresponding tubes extending between said outer and inner apertures.

15. A nozzle according to claim 9 wherein said inner lobes are imperforate adjacent said apertures in said outer chutes.

16. A nozzle according to claim 15 further comprising:
   a circumferential plenum disposed radially between said outer and inner mixers, and being isolated from said outer and inner chutes;
   a manifold disposed circumferentially in said plenum; and
   a plurality of conduits extending in flow communication from said manifold to respective ones of said outer apertures.

17. A nozzle according to claim 16 further comprising means for selectively supplying pressurized flow to said manifold for discharge through said outer apertures.

18. A nozzle according to claim 17 wherein said means comprise an inlet tube extending through said forward end of said inner mixer in flow communication with said manifold.

19. An exhaust nozzle comprising:
   an annular fan nacelle surrounding a core cowling to define a fan duct therebetween for channeling fan exhaust flow;
   an outer mixer extending aft from an aft end of said fan nacelle, and having a plurality of circumferentially alternating outer lobes and outer chutes extending axially between forward and aft ends thereof, with said outer lobes projecting radially outwardly, and said outer chutes extending radially inwardly;
   an inner mixer extending aft from said nacelle aft end, and disposed coaxially inside said outer mixer, and having a plurality of circumferentially alternating inner lobes and inner chutes extending axially between forward and aft ends thereof, with said inner lobes projecting radially inwardly, and said inner chutes extending radially outwardly; and
   said forward ends, said outer and inner mixers being spaced radially apart, and said aft ends of said outer and inner mixers being joined together to prevent flow discharge therebetween and to define a common outlet of said nozzle at said inner chutes positioned around said core cowling for discharging exhaust flow.

20. A nozzle according to claim 19 wherein:
   said fan nacelle has an outer skin and an inner skin; and
   said outer mixer extends aft from said outer skin, and said inner mixer extends aft from said inner skin.

21. A nozzle according to claim 20 wherein said outer mixer converges aft from said outer skin.

22. A nozzle according to claim 20 wherein:
   said inner mixer converges aft from said inner skin for converging flow area in said fan duct around said core cowling to said nozzle outlet; and
   said outer and inner mixers are spaced radially apart from each other to define a plenum therebetween extending both circumferentially between a plurality of adjacent lobes and axially from said forward ends and terminating at said aft ends.

23. A nozzle according to claim 20 wherein said core cowling includes a core exhaust nozzle at an aft end thereof having a conical outer surface.

24. A nozzle according to claim 1 further comprising:
   a core cowling surrounding a core engine for producing core exhaust flow; and
   both said outer and inner mixers extend aft from an aft end of said cowling to define a core exhaust nozzle for discharging said exhaust flow along said inner chutes and out said nozzle outlet.

25. A nozzle according to claim 24 further comprising a center plug spaced radially inwardly from said inner mixer and extending aft therefrom to define said core nozzle radially therebetween.

26. A nozzle according to claim 25 further comprising an annular fan nacelle surrounding said core cowling to define a fan duct therebetween having a fan exhaust nozzle for discharging fan exhaust flow aft over said core nozzle.

27. A nozzle according to claim 26 wherein said fan nozzle has a conical outer surface, and said outer chutes include a plurality of outer apertures.

* * * * *

UNITED STATES PATENT AND TRADEMARK OFFICE
CERTIFICATE OF CORRECTION

PATENT NO. : 6,786,038 B2 Page 1 of 1
APPLICATION NO. : 10/372551
DATED : September 7, 2004
INVENTOR(S) : Jean-Pierre Lair It is certified that error appears in the above-identified patent and that said Letters Patent is hereby corrected as shown below:

Column 2, line 37, delete "cart" and substitute -- part --.
Col. 10, Claim 19, line 18, in the phrase "said forward ends, said outer and inner mixers being" delete the comma between "ends" and "said," and insert the word -- of -- therebetween.

Signed and Sealed this

Twenty-fifth Day of July, 2006

JON W. DUDAS
*Director of the United States Patent and Trademark Office*